March 13, 1973  SUNAO ISHIZAKA ET AL  3,720,149
LIGHT SHIELDING DEVICE FOR INTERCHANGEABLE LENS CAMERA
Filed April 7, 1969
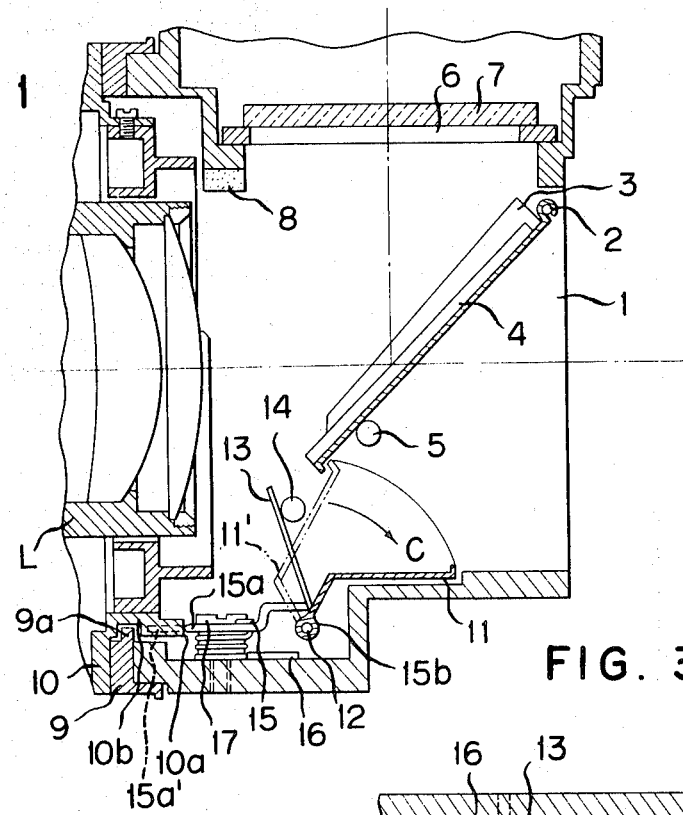
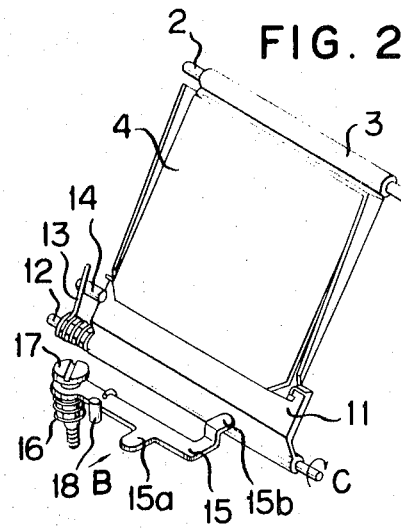
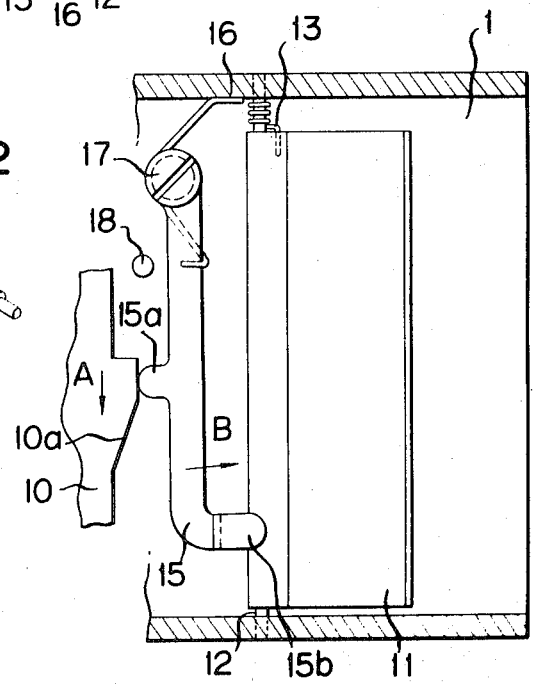
INVENTORS
SUNAO ISHIZAKA
MINORU TAKAHASHI
BY
Harry S. Shapiro
ATTORNEY United States Patent Office 3,720,149
Patented Mar. 13, 1973

3,720,149
LIGHT SHIELDING DEVICE FOR INTER-
CHANGEABLE LENS CAMERA
Sunao Ishizaka, Tokyo, and Minoru Takahashi, Kana-
gawa-ken, Japan, assignors to Nippon Kogaku K.K.,
Tokyo, Japan
Filed Apr. 7, 1969, Ser. No. 814,066
Claims priority, application Japan, Apr. 9, 1968,
43/28,507
Int. Cl. G03b 17/24
U.S. Cl. 95—44                                4 Claims

ABSTRACT OF THE DISCLOSURE

A light shielding device for cameras with interchangeable lenses which prevents the light entering the camera body through the lens mounting opening from reaching the shutter curtain when there is no lens mounted in the camera body. A light shielding plate mounted within the camera body is biased to a position interposed between the lens mounting opening and the shutter curtain. A cam means on each of the interchangeable lenses for the camera actuates an interlocking device within the camera to withdraw the light shielding plate from between the lens and the shutter curtain as the lens is installed in the camera body.

---

This invention relates to a camera of the interchangeable lens type having a focal plane shutter and more particularly, to a light shielding device for the opening of the lens mounting member on the camera body.

In the conventional interchangeable lens focal plane shutter camera, the opening of the lens mounting member on the camera body is larger than the aperture of the lens to be mounted so that, when no lens is mounted, the incident light rays passing through the opening of the lens mounting member are scattered in the camera body and this scattered light easily leaks through the gap between the shutter curtains.

Another problem present in interchangeable lens is that dirt, which is the cause of many troubles, can easily enter the interior of the camera.

In the case of a single lens reflex camera the said drawbacks are reduced to some extent compared with the case of an interlocking range finder type camera because the single lens reflex camera is provided with a reflecting mirror positioned behind the opening of the lens mounting member. However, since it is necessary to swing up the reflecting mirror at the moment of exposure, the size of the reflecting mirror cannot be made very large. As a result, there is usually a large gap between the lower end of the reflecting mirror and the camera body so that the dust and incident light rays passing through the large gap are scattered and the camera has the same drawbacks as mentioned above.

An object of this invention is to offer a simple device which is actuated by the procedure for interchanging the camera lenses to remove the above-mentioned defects.

With this invention, it is possible to seal light and dust from interchangeable lens cameras of the interlocking range finder and single lens reflex types. In the single lens reflex type camera, the gap between the camera body and the lower end of the reflecting mirror will always be covered when a lens is not mounted on the camera. The invention sets forth a simple mechanism which is actuated by the lens interchanging operation, without making any change on the reflecting mirror driving device and lens interchanging system, to interpose and withdraw a shielding plate in the picture-light path when the lens is removed or mounted in the camera. Therefore, the incident light coming from the opening of the lens mounting member when a lens is not mounted can be interrupted and the inter-curtain leakage of light can be effectively prevented. When the lens is mounted the shielding plate is automatically withdrawn from the picture taking light path.

Another advantage of this invention is that dirt can be prevented from entering the interior of the camera.

The light shielding device according to this invention is constructed to interrupt external light incident upon the shutter curtain from the opening of the lens mounting member in the camera body when the lens is detached and includes; a light shielding plate rotatable between a light shielding position and a withdrawn position, provided in the camera body and urged to the light shielding position by a resilient member. An interlocking member, one end of which is in contact with the shielding plate is installed in the camera body and engages a cam surface fixed on the interchangeable lens so that the interlocking member withdraws the light shielding plate from the path of the picture taking light passing through the lens when the lens is mounted in the camera.

This invention will be described more clearly referring to the illustrative embodiment shown in the attached drawings, in which:

FIG. 1 is a vertical cross section of an embodiment of this invention;

FIG. 2 is a partial perspective view of the essential portion of the same embodiment shown in FIG. 1; and FIG. 3 is a plan view of the essential portion of the same embodiment.

In FIGS. 1, 2, and 3, 1 is a camera body; 3 is a reflecting mirror holding plate, which is fitted, rotatably, to a shaft 2 fixed to the camera body 1, to rotate away from the light path at the time of exposure, being raised by the well-known driving device (not shown), and is in a 45° position as shown in FIGS. 1 and 3; 4 is a reflecting mirror fixed to the reflecting mirror holding plate 3; 5 is the member that controls the 45° position of the said reflecting mirror holding plate 3; 6 is a view frame that determines the view finder; 7 is a focusing plate; 8 is a stop member which regulates the position of the reflecting mirror 4 when the mirror is driven upwardly, 9 is the well-known lens mount on the camera body that is fixed to the camera body 1 and has several pawls 9a on the internal side of the circumference of the mount 9; 10 is the well-known lens mounting member fixed to the interchangeable lens L and has the same number of pawls 10b as the said pawls 9a on the external side of its circumference. When mounting the lens on the camera body, the said mounting member 10 is fixed to the said lens mount 9 by means of several bayonet springs (not shown) on the back of the lens mount 9. In this invention, a cam surface 10a is formed on one of the several pawls 10b (refer to FIG. 3).

As to the operation of mounting and dismounting the lens, the said lens mounting member 10 is so designed as to be rotated in the direction of arrow A against the said camera body 1 when mounting the lens and in the opposite direction to arrow-A when dismounting the lens; 11 is a light shielding plate rotatably mounted on a shaft 12 fixed to the camera body 1 and plate 11 is biased in the opposite direction to the direction of arrow C; 14 is a pin that controls the position of the light shielding plate 11 before the lens is mounted on the camera body; 15 is an interlocking lever rotatably mounted on a shaft 17 fixed to the camera body 1 and lever 15 is biased in the opposite direction to the direction of arrow B; 18 is a stop pin that controls the position of the said interlocking lever 15 against rotation in the opposite direction to the direction of the arrow B.

The interlocking lever 15 has a projection 15a that is pushed aside to the direction of arrow B by the said cam surface 10a when mounting the lens on the camera body, and a projection 15b that moves in the direction of arrow B and thereby pushes the light shielding plate 11 in the direction of arrow C when mounting the lens.

With the afore-mentioned construction, when the lens is not mounted (FIG. 1, 11' and FIG. 2) the light shielding plate 11 and the interlocking lever 15 are rotated in the opposite direction to the direction of arrows C and B respectively by the action of the springs 13 and 16 respectively, and stop upon hitting the controlling members 14 and 18 shielding plate 11 then effectively prevents the light coming from the direction of the lens mount from passing under the lower surface of the reflecting mirror. Further, when the lens is not mounted on the camera body, the interlocking lever 15 is rotated in the clockwise direction about the shaft 17 by the action of the spring 16, as shown by the dotted line 15a in FIG. 1, in which position it is difficult to touch or tamper with the lever from outside the camera body.

When the lens is mounted in the camera body, with the rotation of the lens mount 10 in the direction of arrow A, causes cam surface 10a to push away the projection 15a and rotate the interlocking lever 15 and the said projection 15a by a predetermined angle in the direction of arrow B. During this operation, the said projection 15b pushes against one end of the light shielding plate 11 to rotate and retain the light shielding plate 11 in the direction of arrow C thereby withdrawing the light shielding plate from the picture-taking light path while the lens is engaged in the camera body.

Although in this example the interlocking lever 15 is rotatably mounted on the shaft 17 fixed to the camera body 1, it is of course permissible not to use a shaft but instead to slideably mount the interlocking lever to the camera body.

What is claimed is:

1. A photographic camera having a focal plane shutter comprising, in combination, a lens mounting member forming an opening in the camera body; a light shielding member provided between said lens mounting member and the focal plane shutter and movable between a shielding position at which said light shielding member interrupts the incident light from said opening and a withdrawn position at which said light shielding member is removed from the light path between the opening and the shutter; a resilient member urging said light shielding member toward said shielding position; an interlocking member in said camera body adapted to position the light shielding member against the urging of the resilient member; an interchangeable lens adapted to be mounted in the lens mounting member and having a contacting surface adapted to engage the interlocking member when the lens is mounted in the lens mounting member to operate the light shielding member so that the contacting surface of the interchangeable lens will coact with the interlocking member to move the light shielding member from the shielding position to the withdrawn position when the interchangeable lens is mounted in the lens mounting member and to allow the light shielding member to return to the shielding position when the lens is disengaged from the light shielding member, the lens mounting member contacting surface including a cam surface projecting from the rear end of said lens and engageable with the interlocking member when the lens is mounted.

2. A single lens reflex camera having a reflecting mirror for the view finder movable between a viewing and an exposure position, and a focal plane shutter comprising, in combination, a mirror supporting member rockable between viewing and photographing positions in cooperation with the focal plane shutter; a lens mounting member forming an opening in the camera body; a light shielding member provided between the lens mounting member and the focal plane shutter and rockable between a shielding position at which said light shielding member interrupts at least a part of the incident light rays from the opening and a withdrawn position at which said light shielding member is removed from the picture taking light path; one end of said light shielding member being overlapped with one end of said mirror supporting member when the light shielding member is in the shielding position and the mirror is located in the viewing position; a resilient member urging said light shielding member toward said shielding position, an interchangeable lens mounted in the lens mounting member and having a contacting surface provided on its rear end for operation of said light shielding member, the contacting surface inserted into said opening with the rear end of the interchangeable lens to be mounted and moved with the interchangeable lens between a first position at which the lens is detached from said lens mounting member and a second position in which said lens is fixed thereon, and interlocking means for moving the light shielding member from the shielding position to said withdrawn position in response to the movement of the contacting surface from said first position to said second position against the urging of the resilient member while the lens is mounted, and for moving the light shielding member back to said shielding position in response to the movement of the contacting surface to the second position when the lens is detached, the interlocking means including a pivotable lever having first and second projections disposed between said lens mounting member and said light shielding member, said first projection projected toward said lens mounting member for engaging with the contacting surface, said second projection provided at the free end of said lever and extending toward said shielding member to abut therewith.

3. A single lens reflex camera according to claim 2, wherein the contacting surface includes a cam surface engaging with said first projection when the lens is mounted.

4. A single lens reflex camera according to claim 2, wherein said lens mounting member includes a bayonet joint mechanism about said opening for fixing the lens, the end of said first projection being adjacent to said bayonet joint mechanism, the contacting surface includes a cam surface engaging the end of said first projection when said contacting surface is rotated from said first position to said second position.

References Cited
UNITED STATES PATENTS

| | | | |
|---|---|---|---|
| 1,388,870 | 8/1921 | Lipp | 95—42 |
| 2,352,177 | 6/1944 | Bolsey | 95—42 |

FOREIGN PATENTS

| | | | |
|---|---|---|---|
| 1,248,790 | 11/1960 | France | 95—42 |

JOHN M. HORAN, Primary Examiner

U.S. Cl. X.R.

95—42

UNITED STATES PATENT OFFICE
CERTIFICATE OF CORRECTION

PO-1050 (5/69)

Patent No. 3,720,249　　　　　　　　Dated March 13, 1974

Inventor(s) A. Peltonen

It is certified that error appears in the above-identified patent and that said Letters Patent are hereby corrected as shown below:

Col. 5, line 4:　　after "comprises:" insert ---said shear blade having a first cutting member disposed in a substantially horizontal plane, and---.

Col. 5, line 8:　　change "path," to ---path---.

Signed and sealed this 3rd day of December 1974.

(SEAL)
Attest:

McCOY M. GIBSON JR.
Attesting Officer

C. MARSHALL DANN
Commissioner of Patents